United States Patent
Yabe

(10) Patent No.: US 8,302,203 B2
(45) Date of Patent: Oct. 30, 2012

(54) CONTENT TRANSMISSION SYSTEM, TRANSMISSION SERVER, COMMUNICATION TERMINAL, AND CONTENT TRANSMISSION METHOD

(75) Inventor: Toshiyasu Yabe, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1443 days.

(21) Appl. No.: 11/608,339

(22) Filed: Dec. 8, 2006

(65) Prior Publication Data

US 2007/0143441 A1 Jun. 21, 2007

(30) Foreign Application Priority Data

Dec. 15, 2005 (JP) ................................ P2005-361854

(51) Int. Cl.
*G06F 7/04* (2006.01)

(52) U.S. Cl. ............... 726/27; 726/31; 726/32; 709/217; 707/E17.115; 707/E17.116

(58) Field of Classification Search ................... 709/217, 709/213; 705/67, 68, 112; 707/E17.115; 726/27

See application file for complete search history.

(56) References Cited

U.S. PATENT DOCUMENTS

| | | | |
|---|---|---|---|
| 2002/0073167 A1* | 6/2002 | Powell et al. | 709/217 |
| 2004/0034688 A1 | 2/2004 | Dunn | |
| 2004/0186894 A1 | 9/2004 | Jhingan et al. | |
| 2004/0199604 A1* | 10/2004 | Dobbins et al. | 709/217 |
| 2005/0120232 A1* | 6/2005 | Hori et al. | 713/193 |
| 2006/0294212 A1* | 12/2006 | Kikkawa et al. | 709/223 |
| 2007/0124781 A1* | 5/2007 | Casey et al. | 725/94 |

FOREIGN PATENT DOCUMENTS

| | | | |
|---|---|---|---|
| CN | 1309374 A | | 8/2001 |
| CN | 1363906 A | | 8/2002 |
| CN | 1516492 | * | 7/2004 |
| CN | 1705386 A | | 12/2005 |
| EP | 1 195 974 A1 | | 4/2002 |
| EP | 1 253 761 A2 | | 10/2002 |
| JP | 2000-298689 | | 10/2000 |
| JP | 2003-228656 | | 8/2003 |
| JP | 2004-012866 | | 1/2004 |
| JP | 2005-174132 | | 6/2005 |
| JP | 2005-182564 | | 7/2005 |

OTHER PUBLICATIONS

Book by Sembok et al "Digital Libraries: Technology and Management of Indigenous Knowledge for Global Access. 6th International Conference on Asian Digital Libraries, ICADL2003. Proceedings (Lecture Notes in Comput. Sci. vol. 2911)" Dec. 8-12, 2003 Publisher: Springer-Verlag, Berlin, ISBN: 3-540-20608-6.*

* cited by examiner

*Primary Examiner* — Taghi Arani
*Assistant Examiner* — Jason Lee
(74) *Attorney, Agent, or Firm* — Oblon, Spivak, McClelland, Maier & Neustadt, L.L.P.

(57) ABSTRACT

In a CP server, when a copyright determination unit determines that requested content is copyrighted content, a set up unit sets up a copyrighted content public URL comprising information that can specify a memory region where copyrighted content is stored, and corresponding to a content delivery request by a cellular phone, a transmission unit transmits the copyrighted content public URL together with the copyrighted content, to the cellular phone. Then, a cellular phone acquires the copyrighted content public URL together with the copyrighted content, and attaches the copyrighted content public URL to an electronic mail message which is transmitted to another cellular phone. The other cellular phone can use the received copyrighted content public URL to request the CP server to deliver the copyrighted content.

6 Claims, 14 Drawing Sheets

Fig.6

| ID | COPYRIGHT CONTENT PUBLIC URL | CONTENT |
|---|---|---|
| USER (1) | COPYRIGHT CONTENT PUBLIC URL (1) | COPYRIGHT CONTENT (A) |
| USER (2) | | |
| USER (3) | COPYRIGHT CONTENT PUBLIC URL (2) | |
| USER (4) | COPYRIGHT CONTENT PUBLIC URL (3) | COPYRIGHT CONTENT (B) |
| USER (5) | COPYRIGHT CONTENT PUBLIC URL (4) | |
| USER (6) | | |

Fig.7

| COPYRIGHT CONTENT PUBLIC URL | CONTENT | REFERRAL PURCHASE INFORMATION | |
|---|---|---|---|
| COPYRIGHT CONTENT PUBLIC URL (1) | COPYRIGHT CONTENT (A) | SPONSOR (1) | PURCHASER (1) |
| | | | PURCHASER (2) |
| | | | PURCHASER (3) |
| COPYRIGHT CONTENT PUBLIC URL (2) | | SPONSOR (2) | PURCHASER (4) |
| COPYRIGHT CONTENT PUBLIC URL (3) | COPYRIGHT CONTENT (B) | SPONSOR (3) | PURCHASER (5) |
| COPYRIGHT CONTENT PUBLIC URL (4) | | SPONSOR (4) | |

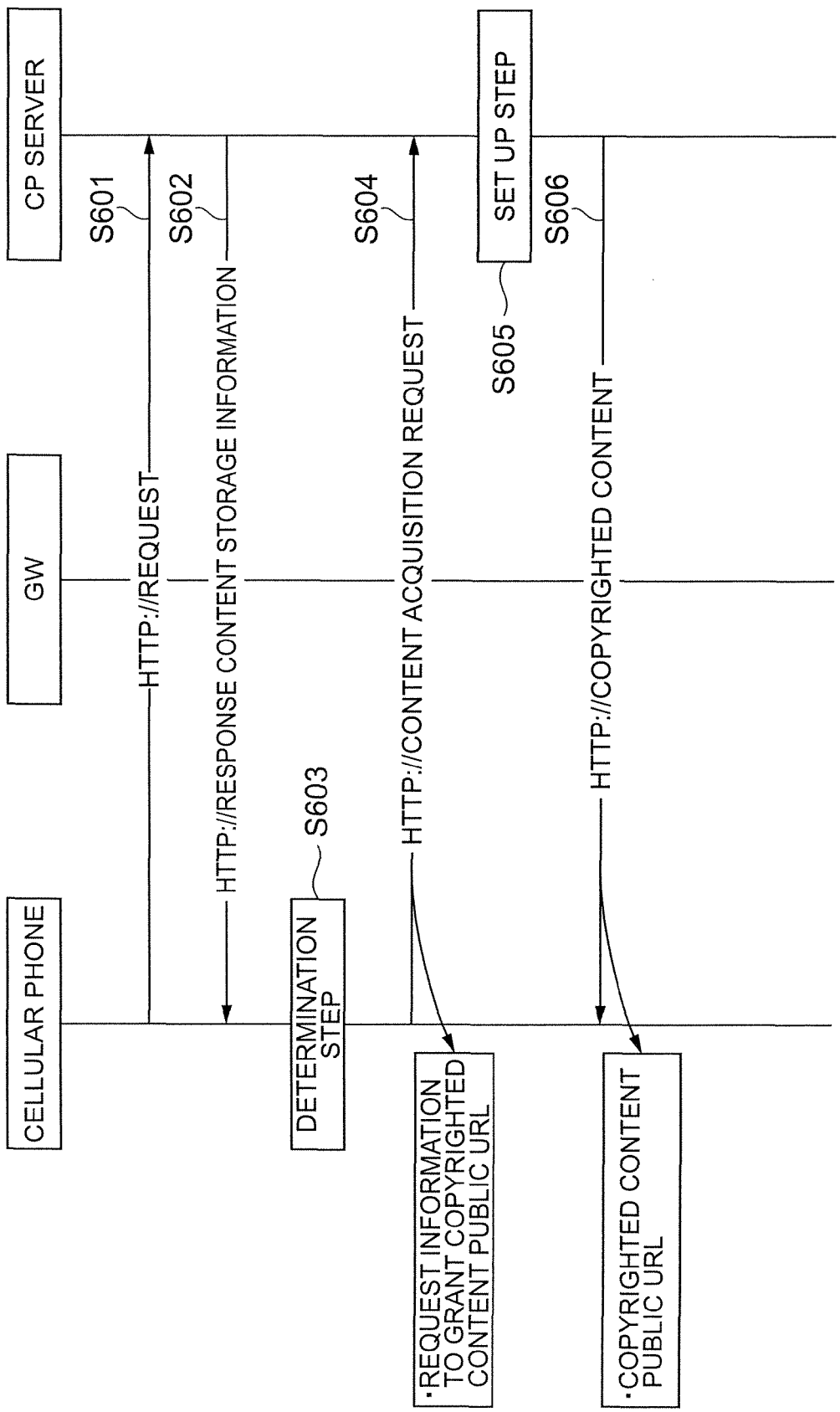

CONTENT TRANSMISSION SYSTEM, TRANSMISSION SERVER, COMMUNICATION TERMINAL, AND CONTENT TRANSMISSION METHOD

BACKGROUND OF THE INVENTION

1. Field of the Invention

The present invention relates to a content transmission system, transmission server, communication terminal, and content transmission method that handle such digital content as copyright protected images, music, and videos.

2. Related Background Art

Recently, fee-based digital content such as ring tones are being purchased using cellular phones and the like. Moreover, digital content such as images, music, and videos can be downloaded by communication terminals that can connect to a network. These contents are copyrighted, and technologies to protect the copyright of the content are well-known. For example, information to prevent duplication of content is embedded in the content file so that the content can only be used by the communication terminal that downloaded the content.

Moreover, cited in Japanese Patent Application Laid-open No. 2005-174132 is technology that, when data with an established copyright is included in the content that a user has designated for mail transmission to a communication terminal, the data with the established copyright is deleted and the mail message is transmitted.

SUMMARY OF THE INVENTION

Specifically, in order to protect the copyright, content cannot be provided to a different user by placing copyrighted content with an established copyright in an electronic mail message. Thus, as a method to introduce the content to a different user, download information such as a URL is provided. However, the user seldom memorizes the URL and the like, and it takes an effort to search again for the URL and the like on the internet. The copyrighted content acquired in this way cannot be easily acquired by another user.

Thus, an object of the present invention is to protect the copyright, and to make it possible to easily acquire copyrighted content that a user has acquired, for other users.

In order to resolve the aforementioned problem, the content transmission system of the present invention is a content transmission system comprising a plurality of communication terminals that can be individually identified and a transmission server connected to a communication network to which the communication terminals belong, wherein (A) the transmission server has: (1) determination module that determines whether or not content is copyrighted content with an established copyright, (2) set up module that sets up access address information comprising information that can specify a memory region where the content determined to be copyrighted content by the determination module is stored, (3) reception module that receives delivery requests requesting delivery of content, from the communication terminals, and (4) transmission module that replies copyrighted content and the applicable access address information in accordance with the delivery request; and (B) the communication terminals have: (1) request module that transmits delivery requests to the transmission server, (2) information acquisition module that acquires copyrighted content and the applicable access address information, from the transmission server, in accordance with the delivery request, (3) storing module that associates and stores the copyrighted content acquired by the information acquisition module with access address information, and (4) transmission module to transmit the access address information stored in the storing module, to another communication terminal.

The content transmission method of the present invention is the content transmission method of a content transmission system configured by comprising a plurality of communication terminals that can be individually identified and a transmission server connected to a communication network to which the communication terminals belong, the method comprising: (1) a requesting step in which a communication terminal transmits a delivery request that requests delivery of content, (2) a reception step in which the transmission server receives the delivery request transmitted in the requesting step, (3) a determining step in which the transmission server determines whether or not the content to be provided is copyrighted content with an established copyright, (4) a set up step in which the transmission server sets up access address information comprising information that can specify a memory region where the content determined, in the determining step, to be copyrighted content in the transmission server is stored, (5) a transmitting step in which the transmission server transmits the copyrighted content and the applicable access address information, to the communication terminals, in accordance with the delivery request received in the reception step, (6) an information acquiring step in which the communication terminal acquires, in accordance with the delivery request, the copyrighted content and the applicable access address information, (7) a storing step in which the communication terminal associates and stores the copyrighted content with access address information, which have been acquired in the information acquiring step, and (8) an information transmitting step in which the communication terminal transmits access address information stored in the storing step, to another communication terminal.

The transmission server of the present invention comprises: determination module that determines whether or not the content is copyrighted content with an established copyright; set up module that sets up access address information comprising information that can specify the memory region where the content determined to be copyrighted content by the determination module is stored; reception module that receives delivery requests requesting delivery of content from the communication terminals; and transmission module that replies copyrighted content and the applicable access address information, in accordance with the delivery request.

The communication terminal of the present invention comprises: request module that transmits delivery requests to the transmission server; information acquisition module that acquires copyrighted content and the applicable access address information, from the transmission server, in accordance with the delivery request; storing module that associates and stores the copyrighted content acquired by the information acquisition module with access address information; and transmission module to transmit the access address information stored in the storing module, to another communication terminal.

According to the present invention, when the determination module determines that this is copyrighted content, the set up module sets up access address information comprising information that can specify the memory region where the copyrighted content is stored, and the transmission module of the transmission server provides the access address information together with the copyrighted content corresponding to the delivery request of the communication terminal, and therefore, the communication terminal can acquire together with the copyrighted content access address information that does not contain the copyrighted content itself, and can be reproduced and attached to electronic mail message. Then, the storing module of the communication terminal associates and stores the copyrighted content with the access address information, and therefore, the communication terminal can manage the access address information together with the copyrighted content. The transmission module transmits the access address information to another communication terminal, and therefore information that can specify the memory region where the copyrighted content is stored can be acquired by the other communication terminal. Consequently, another user can easily acquire the copyrighted content that the user has acquired.

The other communication terminal included in the transmission system of the present invention preferably comprises a reception module that receives the access address information received from the communication terminals, a request module that executes delivery requests for the content using the access address information that the reception module has received, and information acquisition module that acquires copyrighted content and the applicable access address information, from the transmission server, in accordance with the delivery requests.

The other communication terminal that has received access address information from the communication terminal executes the delivery request for copyrighted content using the access address information in this way, and therefore the other communication terminal can acquire copyrighted content. Consequently, another user can easily acquire the copyrighted content that the user has acquired.

Moreover, the set up module of the server of the present invention sets up access address information for every communication terminal that provides content or for every user, and regarding the access address information, preferably the transmission server further has a storing module that associates and stores the information that specifies the communication terminal or user to which the transmission server provides the applicable access address information, with the information that specifies the communication terminal or user which executed the content request using the applicable access address information.

Thereby, the user that acquired the copyrighted content and the user that acquired copyrighted content by acquiring access address information from the former user can be stored, and which user introduced which to the copyrighted content can be recorded.

Moreover, if information acquisition module of the communication terminal acquires copyrighted content corresponding to the request for content executed using the access address information, and acquires access address information associated with the applicable copyrighted content, preferably the storing module of the communication terminal of the present invention deletes the access address information used in the content request, and stores the acquired copyrighted content and access address information.

In this way, when the communication terminal acquires copyrighted content and the corresponding access address information, and the acquired copyrighted content and access address information are stored by replacing the access address information used in the delivery request, and therefore, the newly acquired access address information can be reliably transmitted to a third party. Consequently, the fact of having been transmitted from the applicable communication terminal is reliably stored in the transmission server. Moreover, duplicate downloads of content by a communication terminal user can be prevented.

Moreover, the communication terminal of the present invention comprises: reception module that receives, from a communication terminal, information that has been set up as a transmission address communication terminal function by a transmission server that provides copyrighted content with an established copyright, the information comprising access address information containing information that can specify the memory region where copyrighted content is stored; virtual attachment determination module, which, if access address information is included in the information that the reception module has received, determines that the information is virtual content containing access address information and not containing the content itself; and display module that, when the virtual attachment determination module has determined that there is virtual content, displays the fact that the virtual content has been received.

The user is thereby reliably notified of reception, not the actual content, but rather information containing information that can specify the memory region where the copyrighted content is stored.

According to the present invention, the copyright can be protected, and the copyrighted content that the user acquired can be easily acquired by another user.

BRIEF DESCRIPTION OF THE DRAWINGS

FIG. 6 is a diagram indicating the configuration of a database of information for purchase comprised by a CP server related to the present embodiment;

FIG. 7 is a diagram indicating the configuration of a sponsor information database comprised by a CP server related to the present embodiment;

FIG. 14 is a sequence diagram indicating a variant example of a cellular phone and CP server related to the present embodiment.

DESCRIPTION OF THE PREFERRED EMBODIMENTS

Next, an embodiment of the present invention will be explained while referring to the diagrams. The present embodiment indicates one example of the present invention, and this invention is not thereby limited. Moreover, the present invention can be freely modified within the scope of that technology.

Figure 1:
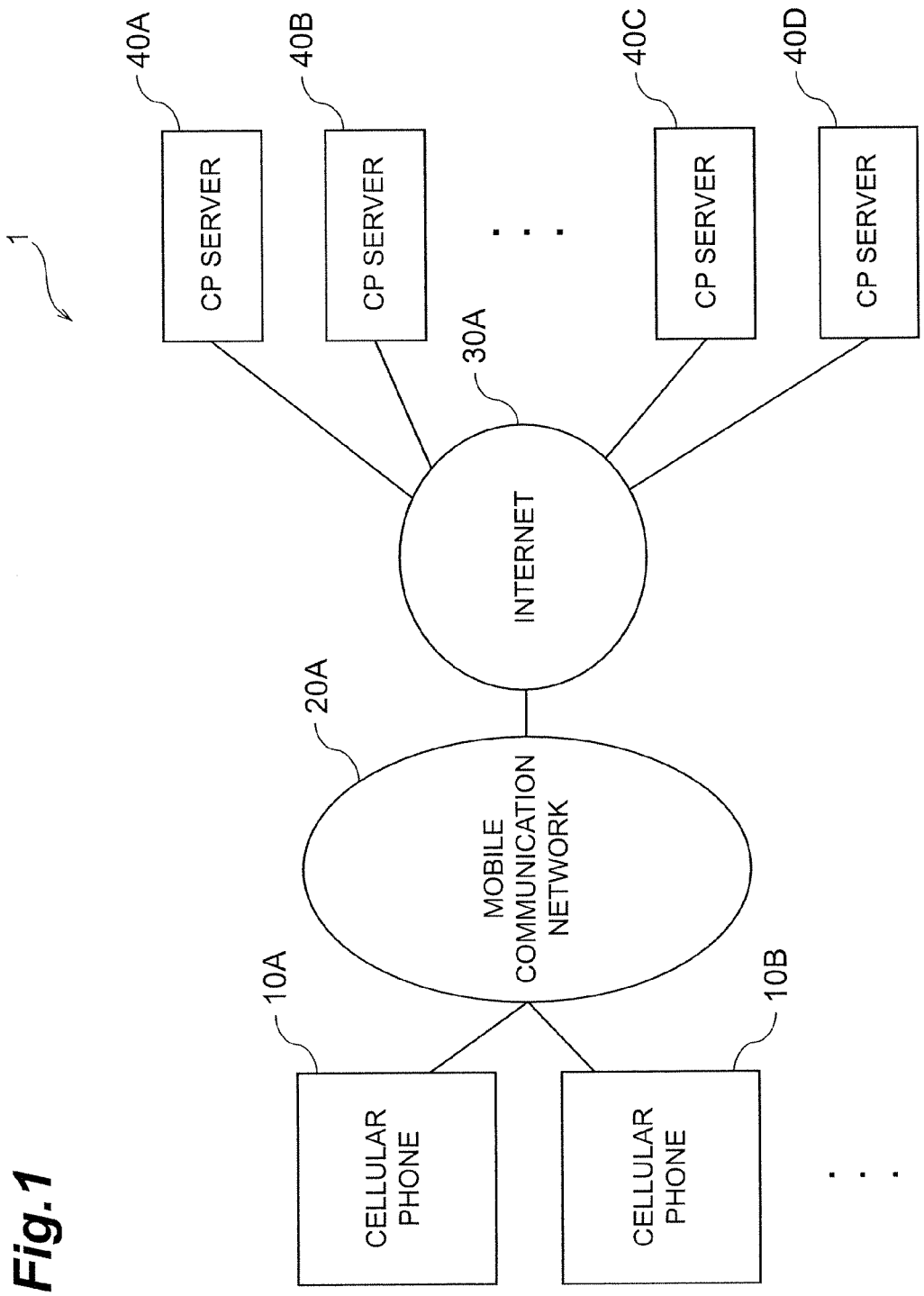
FIG. 1 is a schematic configuration diagram of the content transmission system related to the present embodiment.

FIG. 1 is a schematic configuration diagram of a content transmission system related to the present embodiment. A content transmission system 1 related to the present embodiment comprises: a plurality of cellular phones (communication terminal, another communication terminal, transmission address communication terminal) 10A and 10B; and a plurality of CP (content provider) servers (transmission servers) 40A, 40B, 40C, 40D. The content transmission system 1 is a system that delivers content from the CP servers 40A to 40D that provide content to the cellular phones 10A and 10B. The content transmission system 1 handles content for which copyrights are not established together as well as copyrighted content with established copyrights. In order to protect the copyrights, the copyrighted content is set up to prevent duplication of content and attachment to a mail message and the like.

The CP servers 40A to 40D are servers that deliver digital contents such as images, music, and videos to cellular phones 10A and 10B that general users who use the internet own. For example, CP servers 40A to 40D store content in HTML (hypertext markup language) format files, and provide the content to users. Moreover, the CP servers 40A to 40D provide content while protecting the copyrights by providing copyrighted content such as copyrighted image information, music information, and video information after individual authorization has been executed.

The cellular phones 10A and 10B and the CP servers 40A to 40D are configured to be able to connect to a mobile communications network 20A through an internet 30A. The mobile communications network 20A is configured by a plurality of wireless base stations, a plurality of packet subscriber processing devices, a gateway server and a communication line that connects these devices. The cellular phones 10A and 10B are cellular phones that use a mobile communications network 20A and receive a packet communications service, and WWW browser (World Wide Web) and electronic mail functions are installed.

Figure 2:
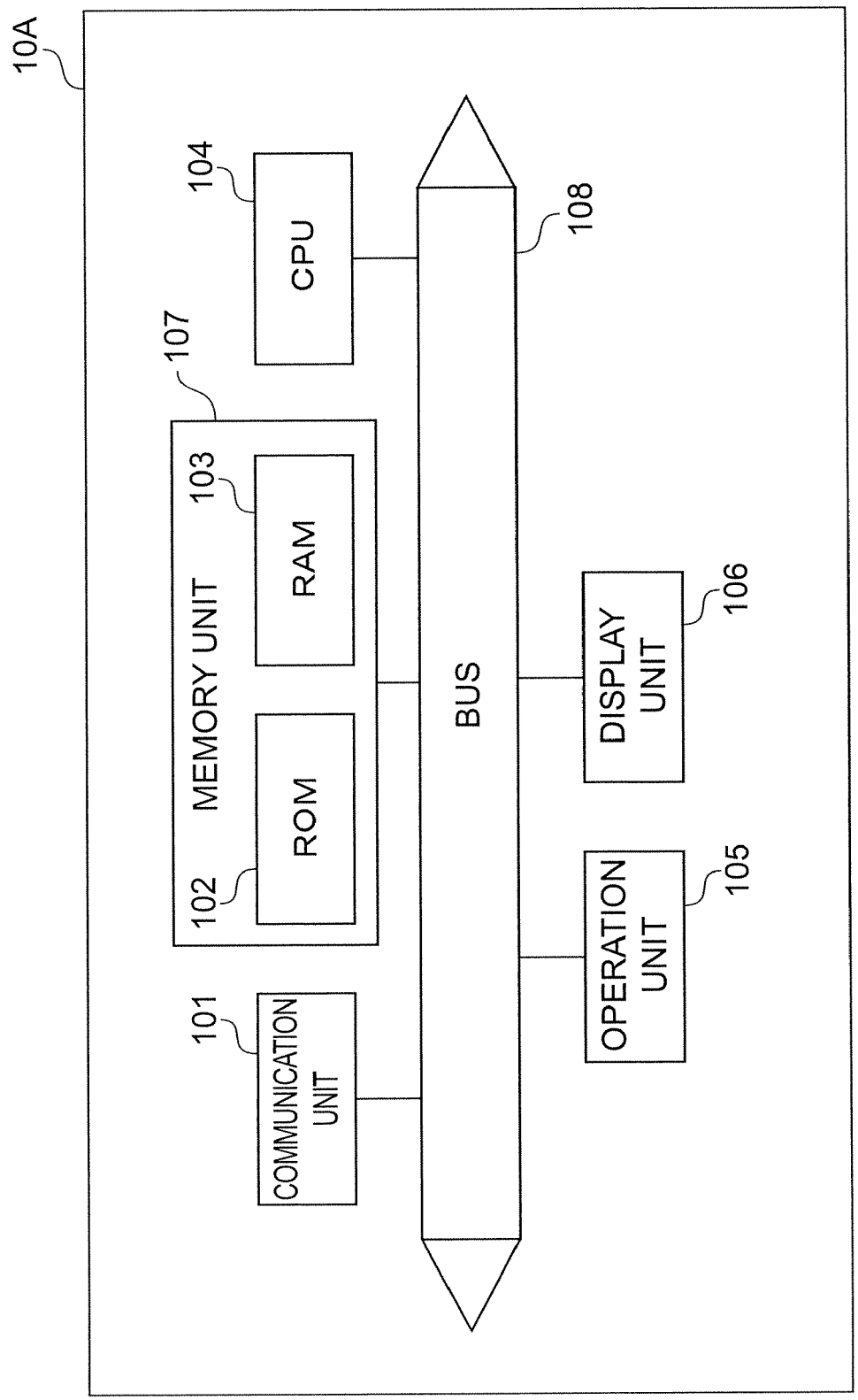
FIG. 2 is a schematic configuration diagram of a cellular phone related to the present embodiment.
Figure 3:
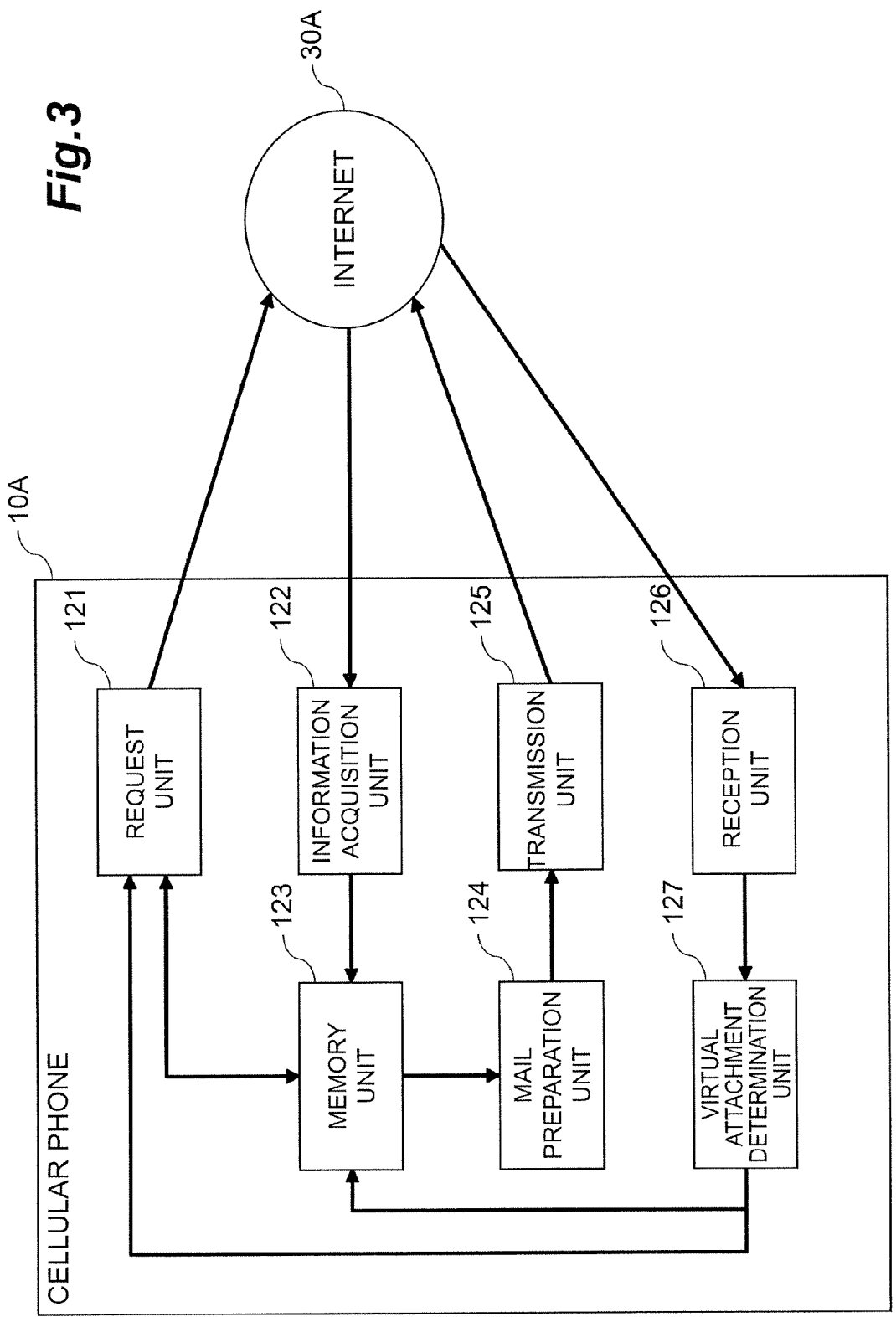
FIG. 3 is a functional configuration diagram of a cellular phone related to the present embodiment.

Next, the cellular phones 10A and 10B will be explained in detail while referring to FIGS. 2 and 3. FIG. 2 is a schematic configuration diagram of a cellular phone related to the present embodiment. FIG. 3 is a functional configuration diagram of a cellular phone related to the present embodiment. The cellular phone 10A and the cellular phone 10B have physical and functional configurations mutually the same, and therefore, the cellular phone 10A will be explained and an explanation of the configuration of the cellular phone 10B will be omitted.

As indicated in FIG. 2, the cellular phone 10A has a communication unit 101, a CPU 104, a operation unit 105, a display unit 106, and a memory unit 107. These configuration elements are mutually connected by a bus 108.

The communication unit 101 conducts wireless data communications with the base stations that the mobile communications network 20A comprises. Controlled by the CPU 104, the communication unit 101 transmits, for example, WWW browser transmission data and electronic mail software transmission data, to the base stations.

The CPU 104 controls each configuration element connected through the bus 108 by executing various types of programs stored in the memory unit 107.

The memory unit 107 comprises ROM (Read Only Memory) 102 and RAM (Random Access Memory) 103. Stored in the ROM 102 are the various types of programs executed by the CPU 104, control data and the like. The various types of programs include, for example, the operating system for the cellular phone 10A and the previously described WWW browser and electronic mail software.

The RAM 103 is used as a work area of the CPU 104. For example, image data, copyrighted image data, and copyrighted content public URLs (access address information) downloaded using electronic mail data received by electronic mail software and the WWW browser are temporarily stored in the RAM 103 for the cellular phone 10A. A copyrighted content public URL is a URL containing information that can specify a memory region where copyrighted content is stored. For example, a copyrighted content public URL is URL or the like that points to the location of a memory region where copyrighted content is stored. Moreover, for example, a copyrighted content public URL may include a dedicated telephone number or wireless key code related to a URL that points to the location of a memory region where copyrighted content is stored.

The operation unit 105 comprises a plurality of keys for entering letters, numbers, operation directions, and the like. The operation unit 105 outputs to the CPU 104 operation signals corresponding to the key operations.

The display unit 106 (display module) comprises a liquid crystal panel that is a display screen, and a drive circuit that drives this liquid crystal panel.

As indicated in FIG. 3, the cellular phone 10A comprises functional configuration elements of: a request unit (request module) 121, an information acquisition unit (information acquisition module) 122, a memory unit (storing module) 123, a mail preparation unit 124, a transmission unit (transmission module) 125, a receiver 126, and a virtual attachment determination unit 127.

The request unit 121 makes requests to the CP servers 40A to 40D to deliver content. The request unit 121 uses the BP and the like that the CP servers 40A to 40D provide, and sends a delivery HTTP request (delivery request) that comprises information specifying content and that requests delivery of content that comprises information specifying content, to the applicable CP server. Moreover, an ID for individual authorization is included in the delivery HTTP request that requests delivery of content.

The ID is information that specifies the cellular phone 10A or the user of the cellular phone 10A. For example, is a given user owns a cellular phone and a PDA, the cellular phone of that user is set up as ID "user (1)" and the PDA of that user is set up as ID "user (2)".

Moreover, the request unit 121 requests delivery of copyrighted content using a copyrighted content public URL output from the virtual attachment determination unit 127 as described later, or a copyrighted content public URL stored in the memory unit 123 as described later. Following the information contained in the copyrighted content public URL, the request unit 121 transmits a delivery HTTP request that contains the copyrighted content public URL information and that requests delivery of the applicable content, to the applicable CP server.

The information acquisition unit 122 downloads content containing the copyrighted content corresponding to the request by the request unit 121, from the CP servers 40A to 40D. The information acquisition unit 122 acquires the copyrighted content public URL together with the copyrighted content, from the CP servers 40A to 40D. When a copyrighted content public URL is acquired, the information acquisition unit 122 determines that the corresponding content is copyrighted content.

If the acquired content is not copyrighted content, the information acquisition unit 122 outputs only the content to the memory unit 123. Moreover, if the acquired content is not copyrighted content, the information acquisition unit 122 outputs the copyrighted content public URL together with the copyrighted content, to the memory unit 123.

The memory unit 123 stores the content output by the information acquisition unit 122. The memory unit 123 relates and stores the output copyrighted content and the copyrighted content public URL. Moreover, memory unit 123 stores the copyrighted content public URL output by the virtual attachment determination unit 127.

Further, if a copyrighted content copyrighted content public URL corresponding to an already stored copyrighted content public URL is output by the information acquisition unit 122, memory unit 123 deletes the already stored copyrighted content public URL. Then, the memory unit 123 stores the copyrighted content and copyrighted content public URL newly output by the information acquisition unit 122.

The mail preparation unit 124 prepares an electronic mail message corresponding to a request of the user of the cellular phone 10A. The mail preparation unit 124 receives a request to attach content to the electronic mail message, from the user of the cellular phone 10A. The mail preparation unit 124 determines whether or not the received content is copyrighted content, and if it is copyrighted content, the applicable copyrighted content public URL stored in the memory unit 123 is attached to the electronic mail message. If the received content is not copyrighted content, the mail preparation unit 124 attaches the file of the applicable content to the electronic mail message. The mail preparation unit 124 outputs the prepared electronic mail message to the transmission unit 125.

The transmission unit 125 transmits the electronic mail message output by the mail preparation unit 124 to the cellular phone 10B (other communication terminal).

The receiver 126 receives the electronic mail message from the cellular phone 10B. The receiver 126 outputs the received electronic mail message to the virtual attachment determination unit 127.

The virtual attachment determination unit 127 (virtual attachment determination module) determines whether or not a virtual attachment file is attached to the electronic mail message output from the receiver 126. A virtual attachment file is a file comprised by a copyrighted content public URL. If a copyrighted content public URL is contained in the electronic mail message, the virtual attachment determination unit 127 determines that a virtual attachment file has been attached.

When the virtual attachment determination unit 127 determines that a virtual attachment file has been attached, the copyrighted content public URL comprised by the applicable electronic mail message is output to the request unit 121 or memory unit 123 based on the information input by the user.

As explained above, cellular phones 10A and 10B are enhanced by installing a WWW browser and electronic mail. Specifically, when content has been downloaded using the WWW browser, the cellular phones 10A and 10B can determine whether or not the downloaded content comprises a copyrighted content public URL. Moreover, if the downloaded content is stored in the memory unit 123 inside the cellular phone, the copyrighted content public URL information can be stored by linking to the file information of the content.

Moreover, the cellular phones 10A and 10B can attach and transmit a copyrighted content public URL using an electronic mail message instead of attaching and transmitting the stored copyrighted content. When using an electronic mail message, the cellular phones 10A and 10B can determine that a virtual attachment file has been received if the mail message contains a copyrighted content public URL.

If determined to be a virtual attachment file, the cellular phone may activate the browser in order to acquire the actual data of the copyrighted content at that location. Moreover, the virtual attachment file may also be stored in a cellular phone with a memory whose size is smaller than size of the actual data file so that the copyrighted content can be acquired later. When storing, the copyrighted content public URL and information, such as the file attributes comprised by the virtual attachment file, are linked and stored.

Figure 4:
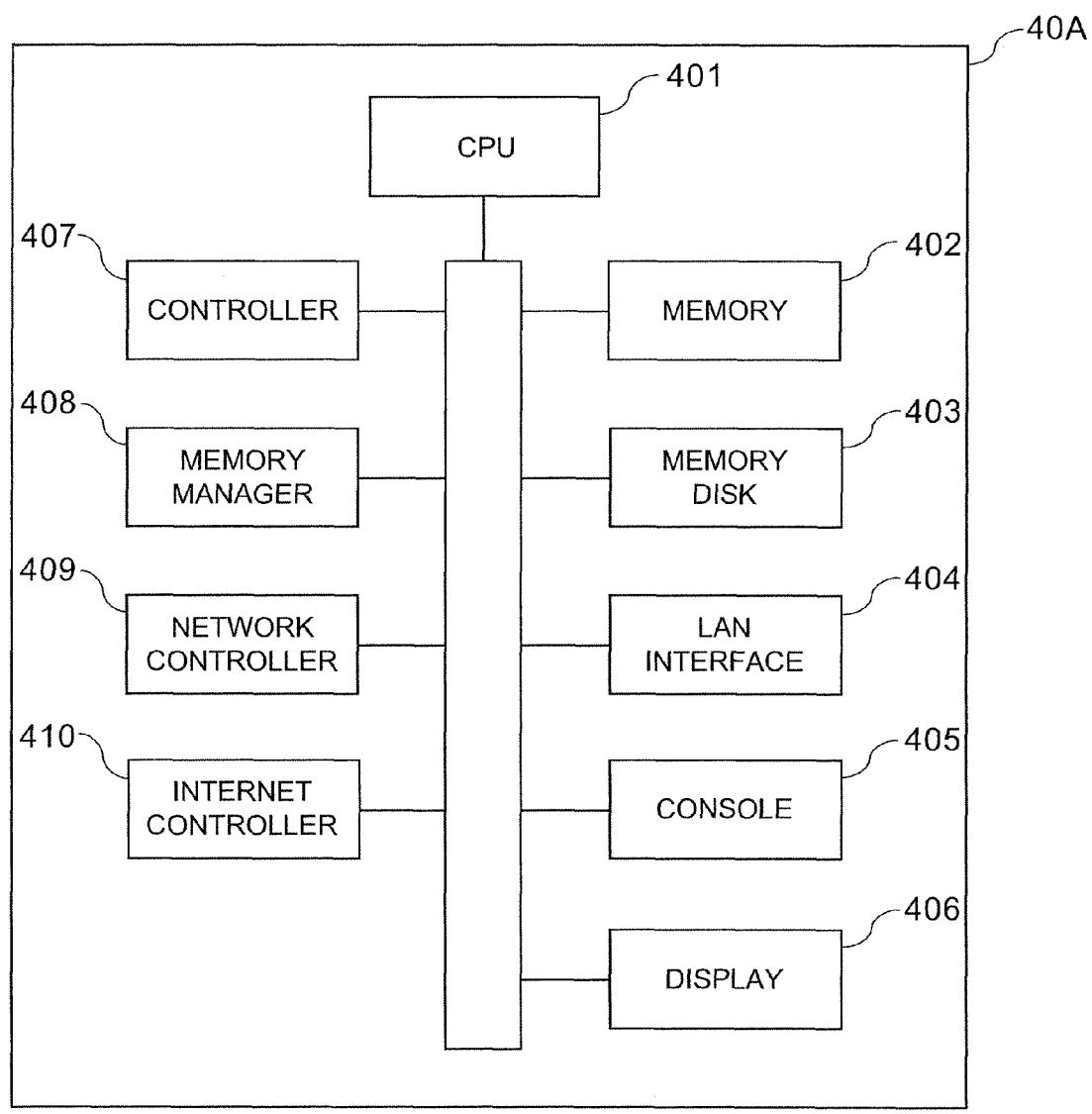
FIG. 4 is a schematic configuration diagram of a CP server related to the present embodiment.
Figure 5:
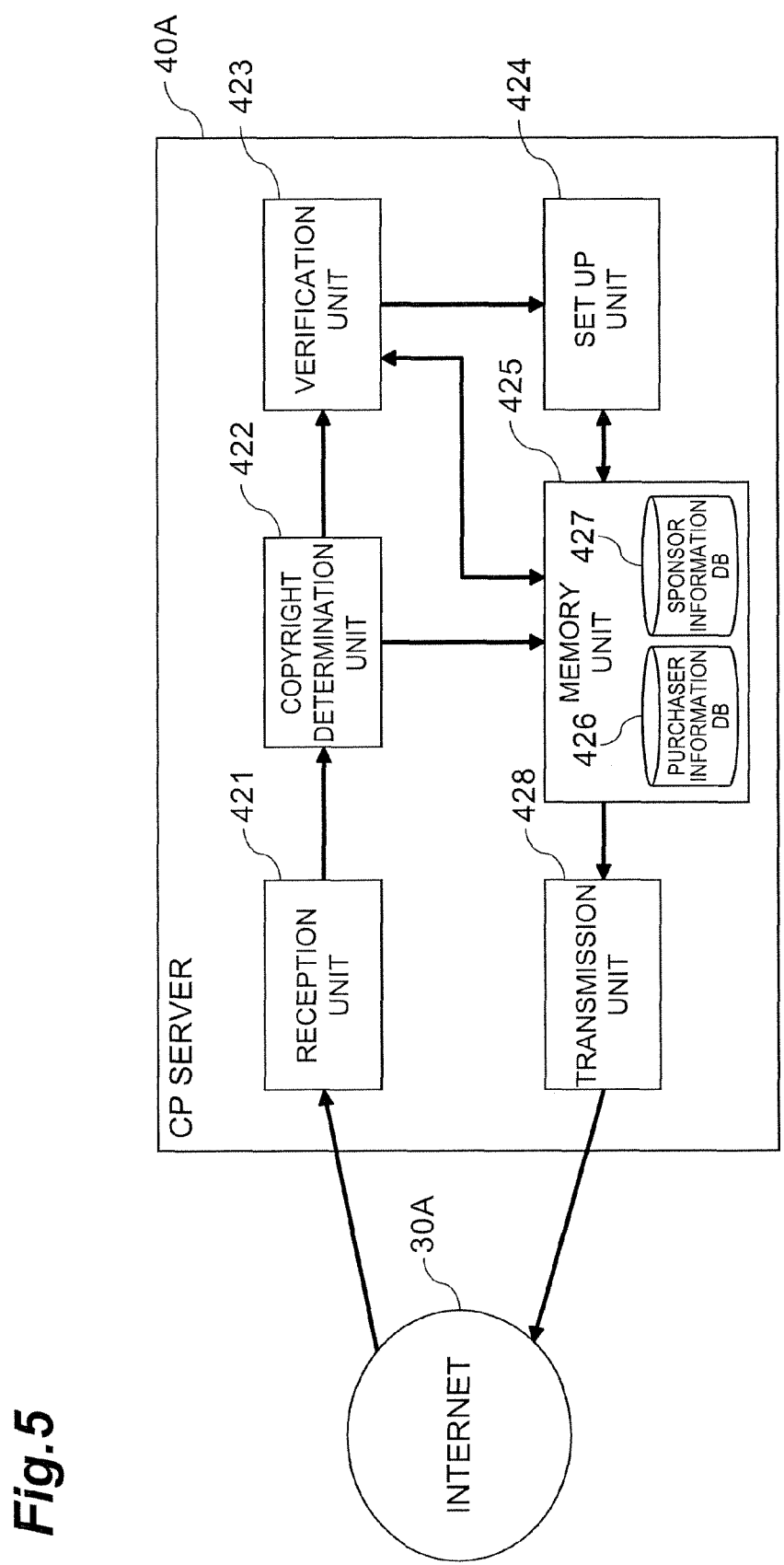
FIG. 5 is a functional configuration diagram of a CP server related to the present embodiment.

Next, the CP servers 40A to 40D will be explained while referring to FIGS. 4 and 5. FIG. 4 is a schematic configuration diagram of a CP server related to the present embodiment. FIG. 5 is a functional configuration diagram of a CP server related to the present embodiment. The CP servers 40A to 40D have physical and functional configurations mutually the same, and therefore, the CP server 40A will be explained, and explanations of the CP servers 40B to 40D will be omitted.

As indicated in FIG. 4, the CP server 40A has configuration elements comprising a CPU 401, a memory 402, a memory disk 403, a LAN interface 404, a console 405, a display 406, a controller 407, a memory manager 408, a network controller 409, and a internet controller 410.

The CP server 40A operates based on the controller 407, network controller 409, and internet controller 410 that operate on the CPU 401.

The delivery HTTP requests that are transmitted from the cellular phones 10A and 10B are relayed in through a LAN interface. After being processed by the internet controller 410, the controller 407 determines the transmitted delivery HTTP request to be a content delivery request.

The controller 407 uses the memory manager 408 to extract the copyrighted content and copyrighted content public URL requested by the content delivery request, from the memory disk 403. The controller 407 prepares a content acquisition response using the extracted copyrighted content and copyrighted content public URL.

The controller 407 delivers the prepared content acquisition response to the network controller 409. The network controller 409 transmits the delivered content acquisition response through the LAN interface 404 to the cellular phone 10A that issued to the content delivery request. The console 405 and the display 406 are used to register, modify and delete copyrighted content, and to edit control data.

Next, the functional configuration elements of the CP server 40A will be explained in detail while referring to FIG. 5. The CP server 40A has functional configuration elements comprising: a receiver (reception module) 421, an authorization unit 423, a copyright determination unit (determination module) 423, a set up unit (set up module) 424, a memory unit (storing module) 425, and a transmission unit (transmission module) 428.

The receiver 421 receives content delivery requests from the cellular phones 10A and 10B. Specifically, the receiver 421 receives delivery HTTP requests that comprise information specifying content, and that request delivery of the content. Moreover, the receiver 421 receives delivery HTTP requests that comprise copyrighted content public URL information, and that request delivery of the applicable content. The receiver 421 outputs the received delivery HTTP request to the copyright determination unit 422.

The copyright determination unit 422 determines whether or not the content requested by the delivery HTTP request is copyrighted content with an established copyright. The copyright determination unit 422 determines that the requested content is copyrighted content if a copyrighted content public URL is contained in the delivery HTTP request.

Moreover, if a copyrighted content public URL is not included in the delivery HTTP request, the copyright determination unit 422 extracts the applicable content from within the content stored in the memory unit 425 based on the information specified in the content included in the delivery HTTP request. If information that prohibits the transfer of the file is embedded in the extracted content, the copyright determination unit 422 determines that the requested content is copyrighted content; and if information that prohibits the transfer of the file is not embedded in the extracted content, the requested content is determined to be content with no established copyright.

If determined that the requested content is content with an established copyright, the copyright determination unit 422 outputs the applicable delivery HTTP request to the authorization unit 423. If determined that the requested content is not content with an established copyright, the copyright determination unit 422 outputs the applicable delivery HTTP request to the memory unit 425.

The authorization unit 423 verifies the user using the ID contained in the delivery HTTP request output from the copyright determination unit 422 and the purchase information database 426 to be described later. Moreover, if a copyrighted content public URL is included in the delivery HTTP request, the authorization unit 423 refers to the sponsor information database 427 to be described later, and verifies the sponsor that transmitted the copyrighted content public URL. After authorization, the authorization unit 423 outputs the delivery HTTP request to the set up unit 424.

The set up unit 424 sets up the copyrighted content public URL corresponding to the ID and content indicated in the delivery HTTP request that was output. For example, if the ID included in the delivery HTTP request is "user (1)" and the content to be requested is "copyrighted content (A)", the set up unit 424 sets up a "copyrighted content public URL (1)" relating to the "user (1)" and the copyrighted content (A)". More concretely, the set up unit 424 sets up a copyrighted content public URL by adding information corresponding to the ID to the URL and the like that can specify the memory region where the copyrighted content is stored.

Moreover, for example, a delivery HTTP request may be sent that requests the same "copyrighted content (A)" from the cellular phone (ID "user (1)") and PDA (ID "user (2)") owned by a given user. If the format of the "copyrighted content (A)" corresponding to the cellular phone having the ID "user (1)" and the format corresponding to PDA having the ID "user (2)" are the same, the set up unit 424 sets up the same "copyrighted content public URL (1)" in relation to the ID "user (1)" and ID "user (2)". If the format of the "copyrighted content (A)" corresponding to the cellular phone having the ID "user (1)" and the format corresponding to PDA having the ID "user (3)" are different, the set up unit 424 sets up "copyrighted content public URL (1)" in relation to the cellular phone having the ID "user (1)" and sets up "copyrighted content public URL (2)" in relation to the PDA having the ID "user (3)".

The set up unit 424 outputs to the memory unit 425 the copyrighted content public URL and the delivery HTTP request set up in this way.

The memory unit 425 has the purchase information database 426 and the sponsor information database 427. FIG. 6 is a diagram indicating the configuration of a database of information for purchase comprised by a CP server related to the present embodiment. FIG. 7 is a diagram indicating the configuration of a sponsor information database comprised by a CP server related to the present embodiment.

As indicated in FIG. 6, the purchase information database 426 relates and stores the user who requested the copyrighted content, the copyrighted content, and the corresponding copyrighted content public URL. For example, the purchase information database 426 relates and stores the ID "user (1)" that is included in the delivery HTTP request, the "copyrighted content (A)" that is the target of the request, and the "copyrighted content public URL (1)" that was set up by the set up unit 424.

If the set up unit 424 has set up the same "copyrighted content public URL (1)" for the ID "user (1)" and the ID "user (2)" in relation to the "copyrighted content (A)", the purchase information database 426 relates and stores the "user (1)", the "user (2)" and the "copyrighted content public URL (1)" in relation to the "copyrighted content (A)". Moreover, if the set up unit 424 sets up the "copyrighted content public URL (1)" for "copyrighted content (A)" in relation to the ID "user (1)", and sets up the "copyrighted content public URL (2)" in relation to the ID "user (3)", the purchase information database 426 relates and stores the "user (1)" and the "copyrighted content public URL (1)", and relates and stores the "user (3)" and the "copyrighted content public URL (2)".

Moreover, as indicated in FIG. 7, the sponsor information database 427 relates and stores the ID specifying the sponsor and the ID specifying the purchaser in relation to the copyrighted content public URL. The ID specifying the sponsor is the ID that specifies the user or communication terminal that set up the copyrighted content public URL and sent notification to the other communication terminal by attaching that copyrighted content public URL to a mail message. The ID specifying the purchaser is the ID that specifies the user of communication terminal that requested the content using the copyrighted content public URL.

For example, in relation to a "copyrighted content public URL (1)" corresponding to a "copyrighted content (A)", sponsor information database 427 relates and stores the "sponsor (1)", which is the ID of the user who set up the "copyrighted content public URL (1)", and the "purchaser (1)", which is the ID of the user who requested the "copyrighted content (A)" using the "copyrighted content public URL (1)".

The memory unit 425 outputs the stored copyrighted content public URL and copyrighted content to the transmission unit 428.

Returning to FIG. 5, in reply to the cellular phone 10A that transmitted the delivery HTTP request, the transmission unit 428 sends the copyrighted content public URL output from the memory unit 425 and the copyrighted content.

Figure 8:
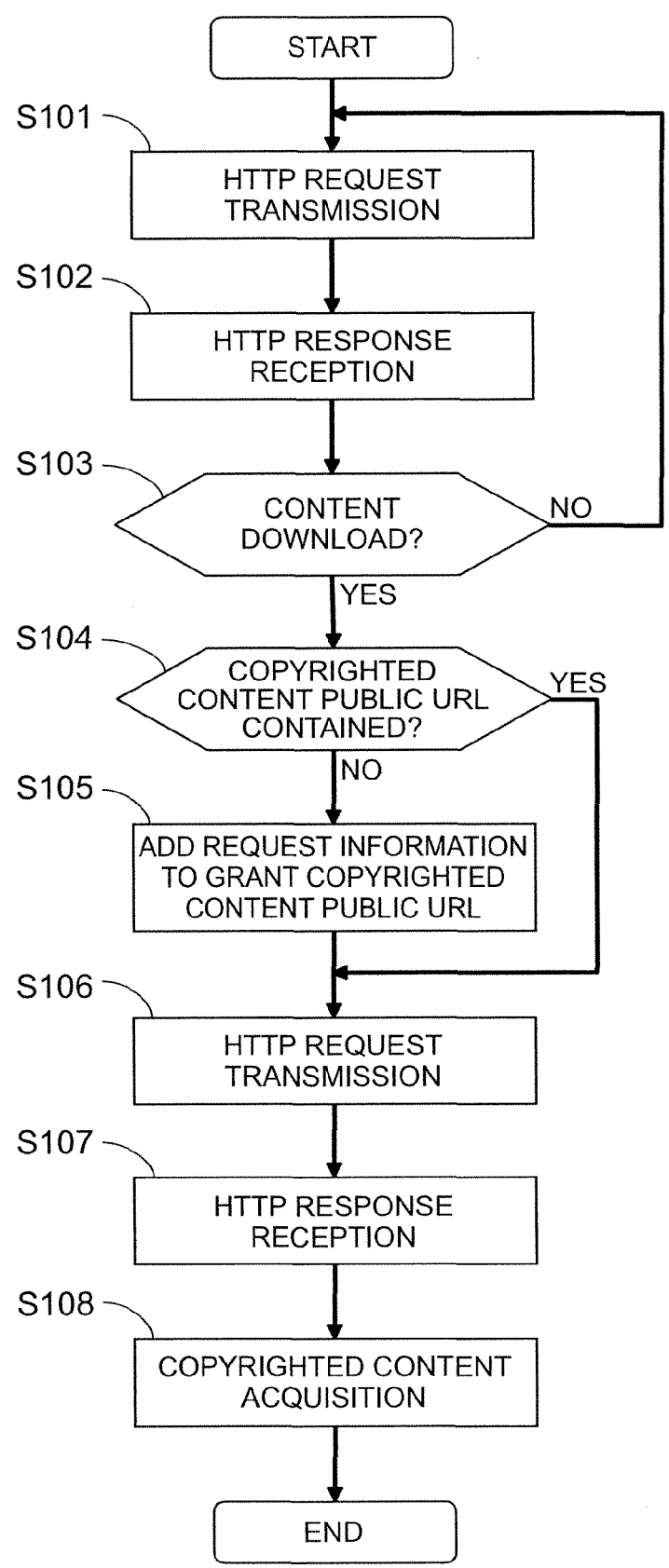
FIG. 8 is a flowchart indicating the operations when a cellular phone acquires copyrighted content and a copyrighted content public URL.

Next, the content transmission method will be explained together with a description of the operation of the content transmission system 1. First, the operation of the cellular phone 10A will be explained while referring to FIG. 8. FIG. 8 is a flowchart indicating the operations when a cellular phone acquires copyrighted content and a copyrighted content public URL.

First, the request unit 121 uses the WWW browser to transmit a delivery HTTP request that requests delivery of copyrighted content to the CP server (S101). The information acquisition unit 122 receives a HTTP response, which is response information corresponding to the delivery HTTP request (S102). The information acquisition unit 122 determines whether or not the HTTP response is response information corresponding to an applicable download of content (S103).

If determined that the HTTP response is not response information corresponding to an applicable download of content (NO at S103), the flow returns to step S101. The applicable CP server is searched in this way. If determined that the HTTP response is response information corresponding to an applicable download of content (YES at S103), the information acquisition unit 122 determines whether or not the HTTP response contains a copyrighted content public URL (S104).

If determined that the HTTP response does not contain a copyrighted content public URL or access address information (NO at S104), an acquisition HTTP request to request delivery of content is prepared by adding information that requests granting of a copyrighted content public URL or access address information (S105). Then, the information acquisition unit 122 transmits the prepared acquisition HTTP request (S106). If determined that the HTTP response contains a copyrighted content public URL or access address information (YES at S104), the memory unit 123 stores the copyrighted content public URL, and an acquisition HTTP request to request content delivery is prepared and is transmitted by the information acquisition unit 122 (S106).

An HTTP response to the acquisition HTTP request is received by the information acquisition unit 122, and the copyrighted content public URL together with the copyrighted content is delivered from the CP server 40A (S107). Then, the cellular phone 10A acquires the copyrighted content and copyrighted content public URL, and the copyrighted content and copyrighted content public URL are related and stored by the memory unit 123 (S108). The cellular phone 10A acquires the copyrighted content and copyrighted content public URL in this way.

Figure 9:
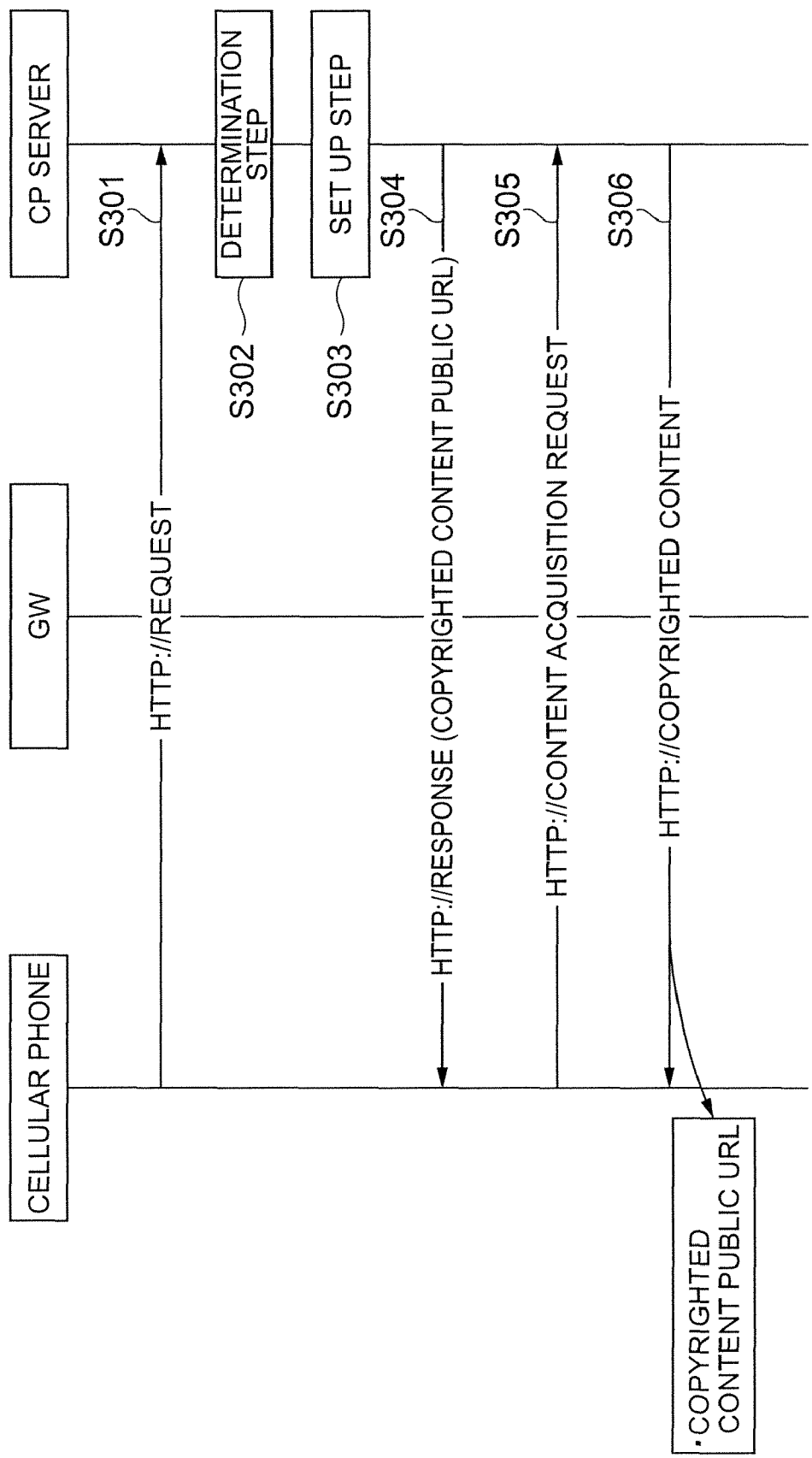
FIG. 9 is a sequence diagram indicating the operations a cellular phone and CP server related to the present embodiment.

Next, the operations of the cellular phone 10A and CP server 40A will be explained while referring to FIG. 9. FIG. 9 is a sequence diagram indicating the operations a cellular phone and CP server related to the present embodiment.

First, the request unit 121 of the cellular phone 10A transmits a delivery HTTP request to the CP server 40A (requesting step) (S301). When the receiver 421 of the CP server receives the delivery HTTP request (reception step), the copyright determination unit 422 determines whether the requested content is copyrighted content (determination step) (S302).

If determined that the requested content is copyrighted content, the set up unit 424 sets up a copyrighted content public URL (set up step) (S303). When a copyrighted content public URL is set up, the transmission unit 428 of the CP server transmits a HTTP response containing the copyrighted content public URL, to the cellular phone 10 (S304).

When the information acquisition unit 122 acquires the HTTP response, information acquisition unit 122 of the cellular phone 10A transmits to the CP server an acquisition HTTP request requesting delivery of content using the copyrighted content public URL contained in the HTTP response (S305).

When the CP server acquires the acquisition HTTP request, the transmission unit 428 of the CP server transmits the copyrighted content corresponding to the acquisition HTTP request to the cellular phone 10A (transmitting step) (S306). The copyrighted content public URL is set up by the CP server in this way, and is provided together with the copyrighted content to the cellular phone 10A (information acquiring step). The copyrighted content and copyrighted content public URL provided this way are mutually related and stored by the memory unit 123 (storing step).

Figure 10:
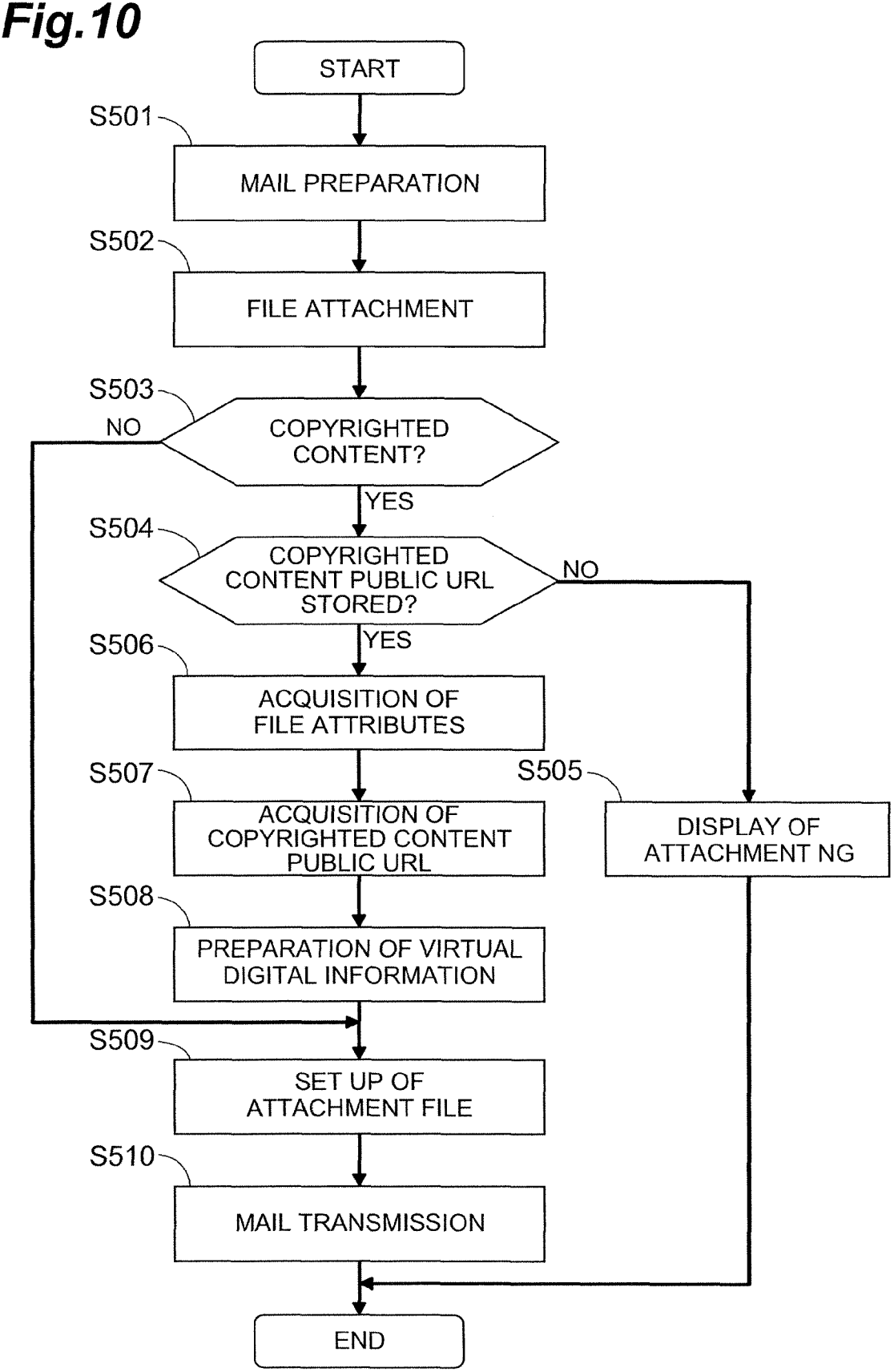
FIG. 10 is a flowchart indicating the operations when a cellular phone prepares an electronic mail message for sending copyrighted content.

Next, the operations when the cellular phone 10A prepares an electronic mail message for sending copyrighted content (information transmitting step) will be explained while referring to FIG. 10. FIG. 10 is a flowchart indicating the operations when a cellular phone prepares an electronic mail message for sending copyrighted content.

First, the mail message is prepared by using the operation unit 105 to add the address, main text and the like (S501). Then, the user selects the content stored in the memory unit 123, and selects the file of the content to be added to the mail message (S502). When the file of the content has been selected, the mail preparation unit 124 determines whether or not the applicable content is copyrighted content (S503).

If determined that the applicable content is not copyrighted content (NO at S503), an attachment file is set up by using the mail preparation unit 124 to attach the file of the applicable content to the electronic mail message (S509). Then, the transmission unit 125 transmits the electronic mail message set up with the attachment file (S510), and mail preparation is ended.

If determined that the applicable content is copyrighted content (YES at S503), and if a stored copyrighted content public URL has not been stored in the memory unit 123 (NO at S504), the display unit 106 displays attachment NG indicating that the selected content cannot be attached (S505). Then, mail preparation is ended.

If a stored copyrighted content public URL is stored in the memory unit 123 (YES at S504), mail preparation unit 124 acquires the information indicating the attributes of the file containing the applicable content (S506). Moreover, the mail preparation unit 124 acquires the copyrighted content public URL of the applicable content from the memory unit 123 (S507).

Then, the mail preparation unit 124 prepares virtual digital information containing the copyrighted content public URL and the information indicating the file attributes (S508). When the virtual digital information is prepared, the mail preparation unit 124 sets up an attachment file by setting up that virtual digital information in the attachment area of an electronic mail message (S509).

Then, the transmission unit 125 transmits the electronic mail message set up with the attachment file (S510). An electronic mail message with an attached copyrighted content public URL is prepared in this way and transmitted to the cellular phone 10B (the other communication terminal).

Figure 11:
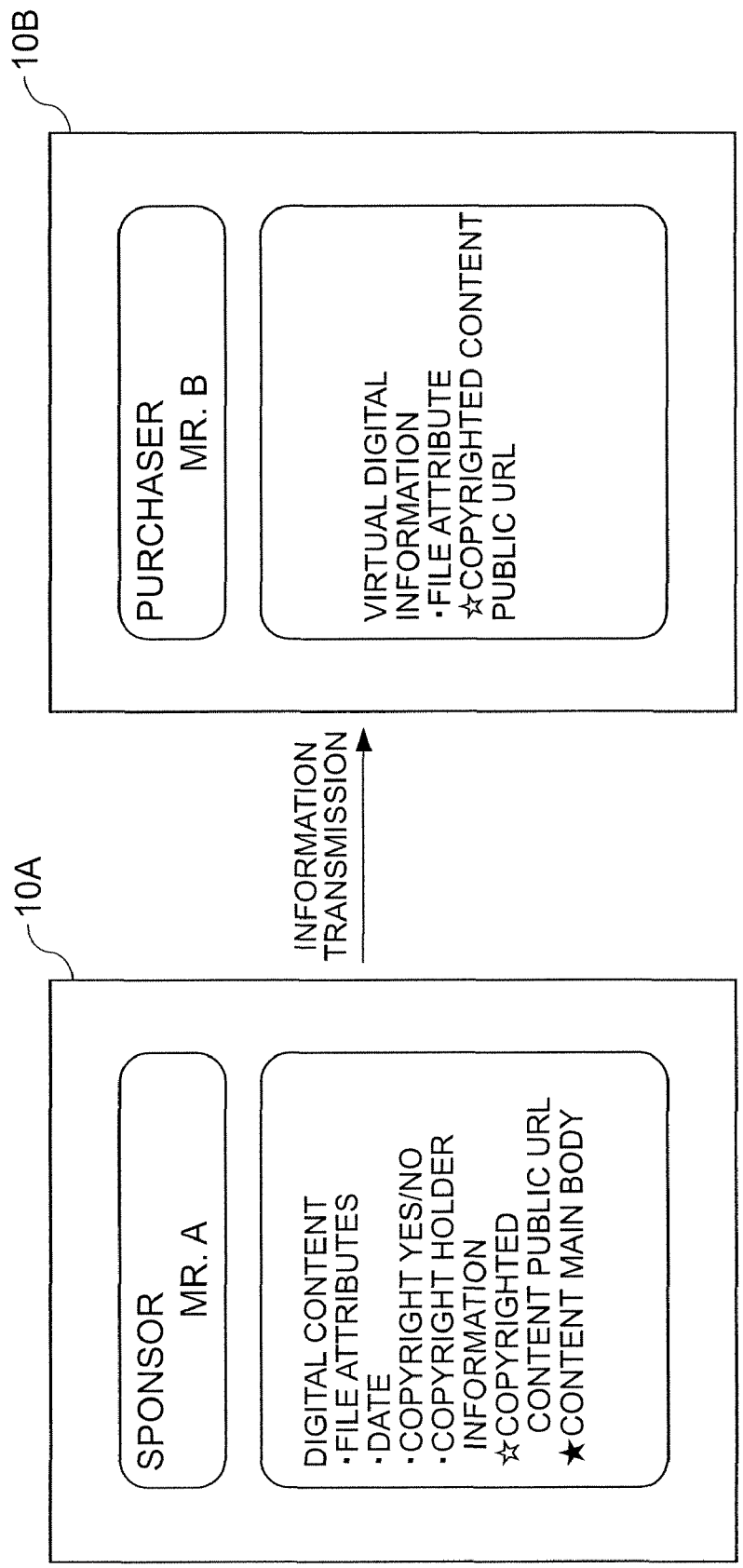
FIG. 11 is a schematic diagram indicating the essential elements of the information of the content to be transmitted together with a copyrighted content public URL from a cellular phone to another cellular phone.

FIG. 11 is a schematic diagram indicating the essential elements of the information of the content to be transmitted together with a copyrighted content public URL from the cellular phone 10A belonging to the sponsor A to the cellular phone 10B belonging to the purchaser B. Regarding the copyrighted content, the memory unit 123 relates and stores the file attributes, date, copyright presence information, copyright holder information, copyrighted content public URL, and content itself. If the cellular phone 10A sends the copyrighted content to the cellular phone 10B using an electronic mail message, the file attributes and the copyrighted content public URL are sent as virtual digital information, and content itself is not sent.

When sending the content stored in the cellular phone 10A in an electronic mail message to the cellular phone 10B in this way, first, the mail preparation unit 124 comprised by the cellular phone 10A determines whether or not the content is copyrighted. If the content to be sent copyrighted content with an established copyright, the content is substituted with the file attributes and the copyrighted content public URL, which is set up in the attachment area of the electronic mail message.

If the virtual attachment determination unit 127 determines that the information attached to the electronic mail message that the cellular phone 10B has received is virtual digital information, the electronic mail message is opened to confirm whether to access the copyrighted content public URL. In that situation, if content has been downloaded by accessing the copyrighted content public URL, the virtual digital information is substituted with copyrighted content information. If downloading has not been executed or has failed, the data is stored following the file attributes of the virtual digital information.

Moreover, if the content to be sent is general content with no established copyright, the cellular phone 10A attaches the actual content (content itself) to an electronic mail message and sends the message to the cellular phone 10B. If the virtual attachment determination unit 127 determines that the information attached to the received electronic mail message is the actual content, the cellular phone 10B opens and displays the electronic mail message.

Figure 12:
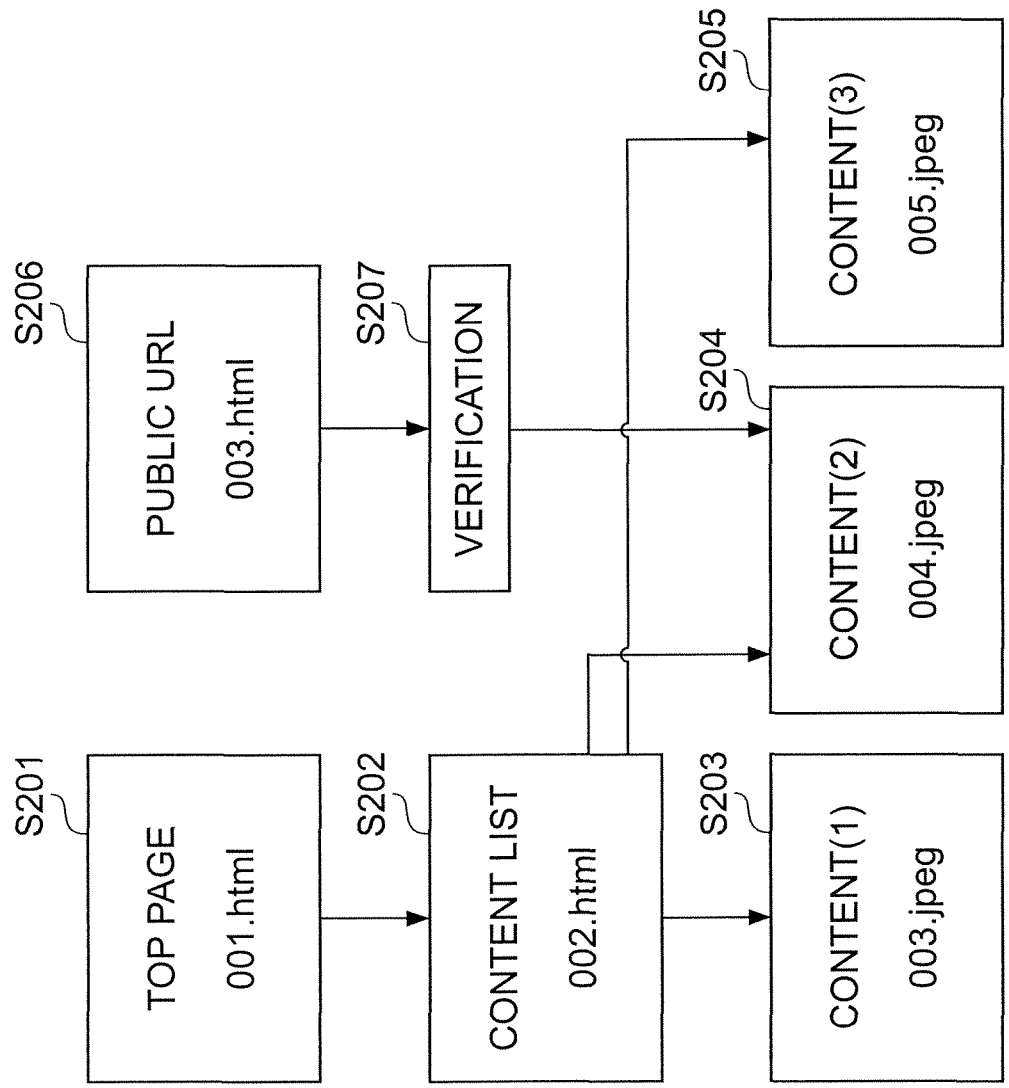
FIG. 12 is a schematic diagram of the screen transitions when accessing a CP server from a cellular phone and downloading copyrighted content.

Next, the screen transitions when accessing the CP server 40A from the cellular phones 10A and 10B and downloading the copyrighted content will be explained while referring to FIG. 12. FIG. 12 is a schematic diagram of the screen transitions when accessing a CP server from a cellular phone and downloading copyrighted content.

When the CP server 40A is accessed from the top page (S201) provided by the CP server 40A, the display unit 106 displays a page listing the copyrighted contents (S202). When selecting "copyrighted content (1)" from the page listing the copyrighted contents (S202), the page indicating "copyrighted content (1)" (S203) is displayed, and the "copyrighted content (1)" and the "copyrighted content public URL (1)" of the "copyrighted content (1)" can be downloaded to the cellular phone 10A. The "copyrighted content (2)", "copyrighted content (3)", "copyrighted content public URL (2)", and "copyrighted content public URL (3)" can be downloaded in the same way.

Moreover, when the cellular phone 10A attaches the downloaded "copyrighted content public URL (2)" to an electronic mail message and sends the message to the cellular phone 10B, a page indicating the "copyrighted content public URL (2)" (S206) is displayed on the cellular phone 10B.

When the cellular phone 10B accesses the CP server 40 following the "copyrighted content public URL (2)" page (S206), an authorization page (S207) is displayed, and authorization is executed. Then, the "copyrighted content (2)" page (S204) is displayed based on the CP server 40A confirming the authorization of the purchaser (cellular phone 10B), and the "copyrighted content (2)" can be downloaded. Further, if the CP side determines that the purchaser is continuing use from before, the authorization (S207) may be omitted.

Figure 13:
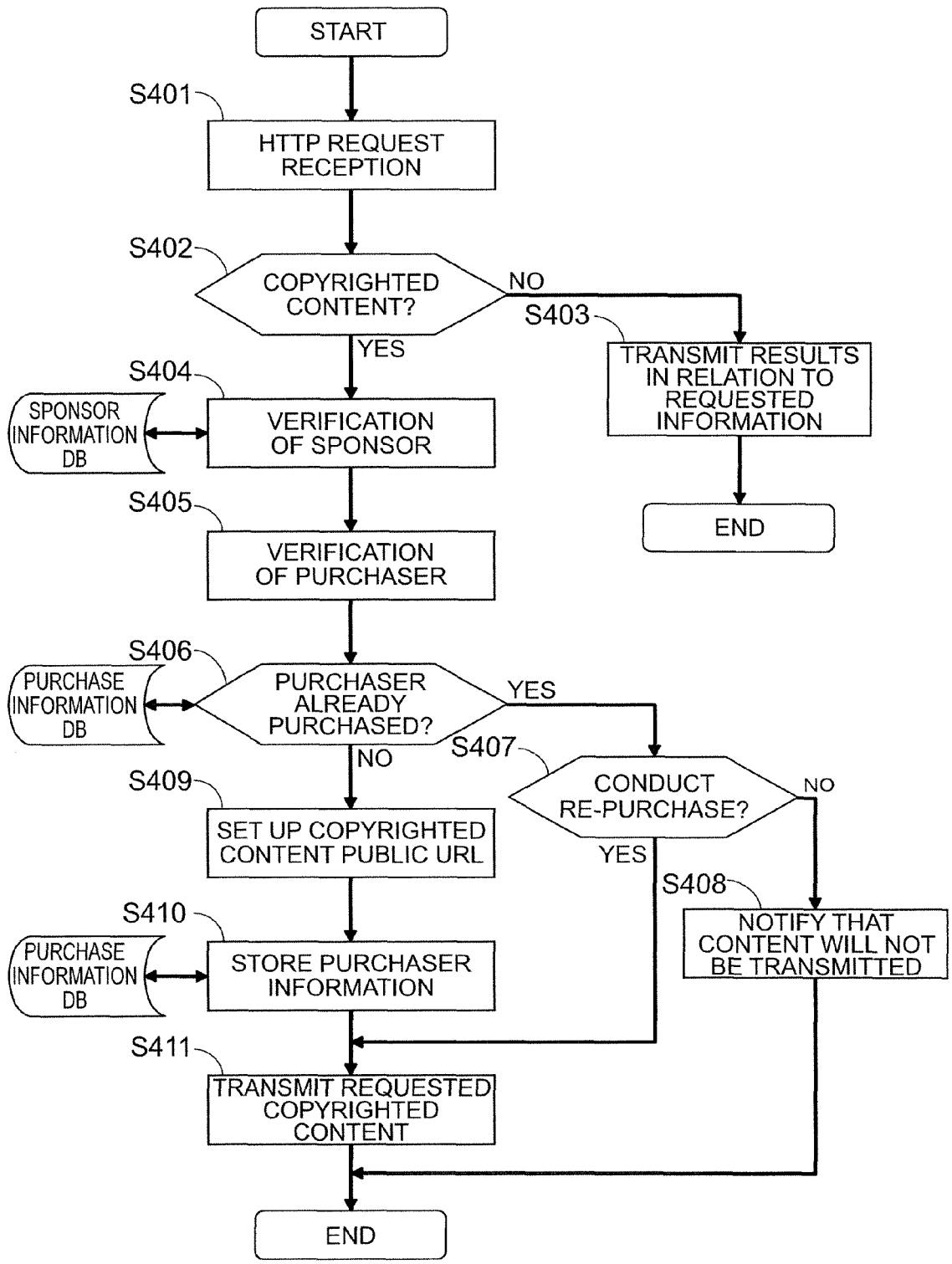
FIG. 13 is a sequence diagram indicating the operations when a CP server manages information relating to a copyrighted content public URL.

Next, the operations of the CP server 40A to manage information relating the copyrighted content public URL will be explained while referring to FIG. 13. FIG. 13 is a sequence diagram indicating the operations when a CP server 40 manages information relating to a copyrighted content public URL.

The cellular phone 10B that requests delivery of the copyrighted content uses the browser function to send a delivery HTTP request containing the copyrighted content public URL. The receivers 421 of the CP servers 40A to 40D receive the delivery HTTP request sent by the cellular phone 10B (S401). The copyright determination unit 422 determines whether or not the requested content is copyrighted content based on the received delivery HTTP request (S402).

IF the requested content is not copyrighted content (NO at S402), the results of providing the requested content are transmitted (S403), and the management operation ends. If the requested content is copyrighted content (YES at S402), the authorization unit 423 verifies the sponsor by referring to the sponsor information database 427 (S404). Specifically, the sponsor is specified by searching the sponsor information database 427 for whom the copyrighted content public URL was granted.

After verifying the sponsor, the authorization unit 423 verifies the purchaser (S405). The authorization unit 423 determines whether or not the purchaser is a purchaser who has already purchased by referring to the purchase information database 426 (S406). Specifically, it is determined whether the same content has been purchased before and that this is not a double purchase.

If, as a result of verifying by referring to the purchase information database 426, the purchaser is a purchaser who has already purchased the applicable copyrighted content (YES at S406), confirmation is conducted by asking whether or not the purchaser is going to re-purchase (S407). If re-purchase will not be conducted (NO at S407), notification is given that the content will not be transmitted (S408), and the management operation ends. If re-purchase is to be conducted (YES at S407), the requested copyrighted content is transmitted (S411), and the management operation ends.

If the purchaser is not a purchaser who has already purchased (NO at S406), the set up unit 424 sets up a copyrighted content public URL (S409). The set up copyrighted content public URL, the copyrighted content, and the ID are related and stored to the purchase information database 426 (S410). Moreover, the set up copyrighted content public URL, the ID that identifies the sponsor, and the ID that identifies the purchaser are stored to the sponsor information database 427. When the purchase information has been stored, the transmission unit 428 transmits the requested copyrighted content and copyrighted content public URL, to the cellular phone 10B (S411).

The CP servers 40A to 40D provide copyrighted content corresponding to the request from the cellular phone 10B in this way, and the information is managed using the purchase information database 426 indicated in FIG. 6, and the sponsor information database 427 indicated in FIG. 7.

Specifically, as indicated in FIG. 6, the purchase information database 426 manages the copyrighted content public URL, the copyrighted content, and the user (purchaser) for every download of copyrighted content. Moreover, using the purchase information database 426 in FIG. 6 as the source, the sponsor information database 427 manages the sponsor and purchaser as indicated in FIG. 7.

More concretely, "sponsor (1)" acquires the "copyrighted content public URL (1)" together with a download of the copyrighted content. Then, the downloaded copyrighted content public URL is attached to electronic mail messages, which are sent to the "purchaser (1)", "purchaser (2)", and "purchaser (3)", and the "purchaser (1)", "purchaser (2)", and "purchaser (3)" download the "copyrighted content (A)". In this case, the "sponsor (1)" introduces the "purchaser (1)", "purchaser (2)", and "purchaser (3)", and when the "copyrighted content (A)" is downloaded, the CP server 40A stores this in the sponsor information database 427.

Moreover, when a plurality of a copyrighted content public URLs are introduced, as with "purchaser (5)", whichever copyrighted content public URL is accessed, redundant control can be avoided by differentiating that this is "purchaser (5)".

The user who acquired the copyrighted content, and the user who acquired the copyrighted content by acquiring the access address information from the former user can be stored, therefore it is possible to store which users introduced which other users to the copyrighted content.

Next the action and effects of the present embodiment relating to the present invention will be explained.

According to the CP servers 40A to 40D of the present embodiment, when the copyright determination unit 422 determines that the requested content is copyrighted content, the set up unit 424 sets up a copyrighted content public URL containing information that can specify a memory region where the copyrighted content is stored, and the transmission unit 428 of the CP servers 40A to 40D provides a copyrighted content public URL together with the copyrighted content corresponding to the content delivery request by the cellular phone 10A. Consequently, the information acquisition unit 122 of the cellular phone 10A can acquire together with the copyrighted content a copyrighted content public URL, which does not contain the copyrighted content itself, and can be duplicated and attached to an electronic mail message. Then, according to the cellular phone 10A of the present embodiment, the memory unit 123 relates and stores the acquired copyrighted content and the copyrighted content public URL, and therefore, the copyrighted content public URL can be managed together with the copyrighted content. Then, the transmission unit 125 of the cellular phone 10A sends the copyrighted content public URL to a cellular phone 10B, and therefore, other communication terminals can acquire information that can specify a memory region where copyrighted content is stored. Consequently, a different user can easily acquire the copyrighted content that the user acquired.

Specifically, a cellular phone 10B that has received a copyrighted content public URL executes a delivery request for copyrighted content using a copyrighted content public URL, and therefore, information that can specify a memory region where copyrighted content is stored can be provided to another communication terminal which out sending the copyrighted content itself, and the copyrighted content can be acquired by the other communication terminal.

Moreover, when the cellular phones 10A and 10B acquire the copyrighted content and corresponding copyrighted content public URL, the acquired copyrighted content and copyrighted content public URL are stored in the memory unit 123 by replacing the copyrighted content public URL used in the delivery request, and therefore, the newly acquired copyrighted content public URL can be reliably sent to a third party. Consequently, the fact that the transmission was made from the applicable cellular phones 10A and 10B can be reliably stored by the transmission server. Moreover, it is possible to control duplicate downloads of content by the users of cellular phones 10A and 10B.

In addition, every time the CP servers 40A to 40D provide content, the copyrighted content public URL is changed, and the information is managed by the sponsor information database 427. For that reason, a "purchaser (1)" can gain access through the introduction of a "sponsor (1)". Consequently, when the "purchaser (1)" purchases the copyrighted content by downloading, feedback such as introduction handling fees can be given to the "sponsor (1)".

The present invention is not limited to the aforementioned embodiment, and can a variety of forms. For example, the determination of whether or not the content is copyrighted content was conducted by the CP servers 40A to 40D, but this may also be executed by the cellular phone 10A. In that case, the cellular phone 10A comprises a copyright determination unit that determines whether or not the content is copyrighted content. If file transfer prohibition information is embedded inside the targeted content, the copyright determination unit determines this is copyrighted content with an established copyright.

If determined to be copyrighted content by the copyright determination unit, the information acquisition unit 122 sends a request to the CP server 40A to provide a copyrighted content public URL together with the copyrighted content.

The operations of the cellular phone 10A and the CP server 40A in this case will be explained while referring to FIG. 14. FIG. 14 is a sequence diagram indicating the operations of the cellular phone 10A and CP server 40A.

First, the request unit 121 of the cellular phone 10A sends a delivery HTTP request to the CP server 40A (S601). When the CP server 40A receives the delivery HTTP request, the transmission unit 428 of the CP server sends a HTTP response that contains information specifying the content to be provided and information indicating the location where the content is stored, to the cellular phone 10A (S602). When the cellular phone 10A receives the corresponding HTTP request, the copyright determination unit determines whether or not the content to be provided is copyrighted content (S603).

If determined that the requested content is copyrighted content, the information acquisition unit 122 sends an acquisition HTTP request that contains information requesting a copyrighted content public URL together with the copyrighted content, to the CP server 40A (S604). When the CP server 40A receives the acquisition HTTP request, the set up unit 424 of the CP server 40A sets up a copyrighted content public URL (S605).

When the CP server 40A acquires a copyrighted content public URL, the transmission unit 428 of the CP server 40A transmits the copyrighted content and copyrighted content public URL corresponding to the acquisition HTTP request, to the cellular phone 10A (S606).

The cellular phone 10A determines that the requested content is copyrighted content in this way, the CP server 40A sets up a copyrighted content public URL, and the a copyrighted content public URL together with the copyrighted content is provided to the cellular phone 10A.

Additionally, the present invention is not limited to the embodiments above, and a variety of forms is possible.

For example, in the embodiment above, the cellular phones 10A and 10B were used as the communication terminals, but the present invention is not limited thereby. For example, communication terminals such as simplified cellular phones having a function for wireless communication with base stations in a mobile communication network, or a portable information terminal connected to a cellular phone or a simplified cellular phone may also be used.

Further, communication terminals such as personal computers or portable information terminals that can connect to a content server or mail server through a network such as the internet or a LAN (Local Area Network) without being relayed through a mobile communication network may also be used.

Moreover, the content with an established copyright explained in the embodiments above was first stored in the cellular phone, but the mail message may also be sent immediately after downloading.

Moreover, image information, music information, and video information were given as examples in the embodiments above, but if copyrighted information is included in the content, the information may also be program files. And the information may also be included in a document file.

The disclosure of Japanese Patent Application No. 2005-361854 filed Dec. 15, 2005 including specification, drawings and claims is incorporated herein by reference in its entirety.

What is claimed is:

1. A content transmission system comprising a plurality of communication terminals that can be individually identified and a transmission server connected to a communication network to which the communication terminals belong, the content transmission system comprising:
the transmission server including
a determination module configured to determine whether content is a copyrighted content with an established copyright;
a set up module configured to set up access address information comprising information specifying a memory region where the content determined to be copyrighted content by the determination module is stored;
a reception module configured to receive delivery requests requesting delivery of content from the communication terminals; and
a transmission module configured to transmit the copyrighted content and an applicable access address information, in accordance with the delivery request, and
the communication terminals include
a request module configured to transmit the delivery requests to the transmission server;
an information acquisition module configured to acquire from the transmission server, in accordance to the delivery requests, copyrighted content and the applicable access address information;
a storing module configured to associate and store the copyrighted content acquired by the information acquisition module with access address information;
an operation unit configured to receive a selection of the copyrighted content or a non-copyrighted content stored at the storing module for transmission to another communication terminal;
a determining unit configured to determine whether the content selected for transmission is the copyright protected content or the non-copyright protected content; and
a transmission module configured to transmit the access address information stored in the storing module and not the copyright protected content to the another communication terminal when the determining unit determines that the selected content is the copyright protected content, and to transmit the non-copyright protected content to the another communication terminal when the determining unit determines that the selected content is the non-copyright protected content.

2. The content transmission system according to claim 1, wherein the other communication terminal comprises:
a reception module configured to receive the access address information transmitted from the communication terminals,
a request module configured to execute delivery requests for the content using the access address information that the reception module has received; and
an information acquisition module configured to acquire copyrighted content and the applicable access address information, from the transmission server, in accordance with the delivery request.

3. A transmission server comprising:
a determination module configured to determine whether content provided to communication terminals is copyrighted content with an established copyright;
a set up module configured to set up access address information comprising information specifying a memory region where the content determined to be copyrighted content by the determination module is stored;
a reception module configured to receive content delivery requests from a communication terminal; and
a transmission module configured to transmit the copyrighted content and an applicable access address information in accordance with the delivery requests, wherein
the set up module is configured to set up the access address information for every communication terminal or every user that provides the content, and
the transmission server further includes a storing module configured to, in relation to the access address information, associate and store information that specifies the communication terminal or user to which the transmission server provides the access address information with information that specifies the communication terminal or user that has requested content using the applicable access address information.

4. A communication terminal comprising:
a request module configured to transmit delivery requests for delivery of copyrighted content with an established copyright, to the transmission server;
an information acquisition module configured to acquire copyrighted content and access address information that contains information specifying a memory region where the copyrighted content is stored, from the transmission server, in accordance with the delivery requests;
a storing module configured to associate and store the copyrighted content with access address information, which have been acquired by the information acquisition module;
an operation unit configured to receive a selection of the copyrighted content or a non-copyrighted content stored at the storing module for transmission to another communication terminal;
a determining unit configured to determine whether a content selected for transmission is the copyright protected content or the non-copyright protected content; and
transmission module configured to transmit the access address information stored in the storing module and not the copyright protected content to the another communication terminal when the determining unit determines that the selected content is the copyright protected content, and to transmit the non-copyright protected content to the another communication terminal when the determining unit determines that the selected content is the non-copyright protected content.

5. The communication terminal according to claim 4, wherein when the information acquisition module of the communication terminal acquires copyrighted content corresponding to a request for content executed using an access address information and the access address information associated with the applicable copyrighted content, the storing module deletes the access address information used in the request for content, and stores the acquired copyrighted content and access address information.

6. A content transmission method in a content transmission system comprising a plurality of communication terminals that can be individually identified and a transmission server connected to a communication network to which the communication terminals belong, the method comprising:
transmitting, from the communication terminal, a delivery request for delivery of content;

receiving, at the transmission server, the transmitted delivery request;

determining, at the transmission server, whether a content to be provided is copyrighted content with an established copyright;

setting up, at the transmission server, access address information comprising information specifying a memory region where the content determined to be copyrighted content in the transmission server is stored;

transmitting, by the transmission server, the copyrighted content and the applicable access address information, to the communication terminals, in accordance with the received delivery request;

acquiring, at the communication terminal, the copyrighted content and the applicable access address information, in accordance with the delivery request;

storing, at the communication terminal, the acquired copyrighted content associated with the access address information;

receiving, at the communication terminal, a selection of the copyrighted content or a non-copyrighted content stored at the communication terminal for transmission to another communication terminal;

determining, at the communication terminal, whether the content selected for transmission is the copyright protected content or the non-copyright protected content; and transmitting, from the communication terminal, access address information stored in the storing step and not the copyright protected content to another communication terminal when the determining unit determines that the selected content is the copyright protected content, and transmitting the non-copyright protected content to the another communication terminal when the determining unit determines that the selected content is the non-copyright protected content.

\* \* \* \* \*